US 9,846,740 B2

(12) United States Patent
Bamford et al.

(10) Patent No.: US 9,846,740 B2
(45) Date of Patent: Dec. 19, 2017

(54) ASSOCIATIVE SEARCH SYSTEMS AND METHODS

(71) Applicant: MIMECAST NORTH AMERICA, INC., Waltham, MA (US)

(72) Inventors: Christopher David Bamford, Farnham (GB); Clive Nicholas Jordan, St. Albans (GB)

(73) Assignee: MIMECAST SERVICES LTD., London (GB)

( * ) Notice: Subject to any disclaimer, the term of this patent is extended or adjusted under 35 U.S.C. 154(b) by 335 days.

(21) Appl. No.: 14/021,391

(22) Filed: Sep. 9, 2013

(65) Prior Publication Data

US 2015/0074085 A1    Mar. 12, 2015

(51) Int. Cl.
*G06F 7/04* (2006.01)
*G06F 17/30* (2006.01)

(52) U.S. Cl.
CPC .. *G06F 17/30675* (2013.01); *G06F 17/30011* (2013.01); *G06F 17/3053* (2013.01); *G06F 17/30395* (2013.01); *G06F 17/30554* (2013.01); *G06F 17/30864* (2013.01)

(58) Field of Classification Search
CPC ........... G06F 17/30864; G06F 17/3053; G06F 17/30554; G06F 17/30011; G06F 17/30395
See application file for complete search history.

(56) References Cited

U.S. PATENT DOCUMENTS

| | | | |
|---|---|---|---|
| 8,868,590 B1 * | 10/2014 | Donneau-Golencer | G06F 17/3053 707/733 |
| 9,280,595 B2 * | 3/2016 | Edwards | G06F 17/3064 |
| 9,367,608 B1 * | 6/2016 | Zhang | G06F 17/30657 |
| 2004/0186827 A1 * | 9/2004 | Anick | G06F 17/30646 |
| 2007/0239676 A1 * | 10/2007 | Stonehocker | G06F 3/0482 |
| 2008/0059451 A1 * | 3/2008 | Musgrove | 707/5 |
| 2008/0154878 A1 * | 6/2008 | Rose et al. | 707/5 |
| 2009/0248674 A1 * | 10/2009 | Suzuki | G06F 17/30867 |
| 2010/0094877 A1 * | 4/2010 | Garbe | G06F 17/301 707/742 |
| 2011/0225163 A1 * | 9/2011 | Lyon | G06F 17/30011 707/740 |
| 2014/0081944 A1 * | 3/2014 | Lee et al. | 707/708 |

(Continued)

*Primary Examiner* — Bruce Moser
(74) *Attorney, Agent, or Firm* — Brown Rudnick LLP; Mark S. Leonardo

(57) ABSTRACT

A computer system including a memory, at least one processor coupled to the memory, and a search component executable by the at least one processor is provided. The search component is configured to receive information descriptive of at least one search term; execute a first query against a plurality of documents that identifies at least one first document of the plurality of documents responsive to the at least one search term; identify one or more secondary terms associated with the at least one first document based on occurrence of the one or more secondary terms within the at least one first document; and provide a search result including at least one of the one or more secondary terms and one or more identifiers of one or more documents including the one or more secondary terms. The search result may also include one or more identifiers of bookmarked documents.

36 Claims, 9 Drawing Sheets

(56) References Cited

U.S. PATENT DOCUMENTS

| | | | |
|---|---|---|---|
| 2014/0129542 A1* | 5/2014 | Haveliwala | G06F 17/3053 707/710 |
| 2014/0250377 A1* | 9/2014 | Bisca | G06F 17/30011 715/705 |
| 2014/0317096 A1* | 10/2014 | Elias et al. | 707/722 |
| 2015/0134632 A1* | 5/2015 | Golan | G06F 17/3053 707/706 |
| 2015/0347596 A1* | 12/2015 | Mandel | G06Q 10/107 707/692 |

* cited by examiner

ASSOCIATIVE SEARCH SYSTEMS AND METHODS

BACKGROUND

Technical Field

The technical field relates generally to search engine based information retrieval and, more particularly, to systems and methods for providing comprehensive and relevant results to search queries.

Background Discussion

Information based economies generate vast amounts of stored information. Efficient and effective use of this stored information continues to be a challenge for individuals and organizations alike. However, several tools and techniques have emerged to meet this challenge. For instance, most personal computing devices, such as personal computers, personal digitals assistants, and smart phones include easily accessible, user-friendly search functions. These search functions enable a user to quickly find, review, and utilize information (e.g., personal contact information, scheduling information, and software applications) stored on these devices.

Perhaps the most widely known and utilized search technology is the internet search engine. Internet search engines crawl the web collecting, storing and organizing information for rapid retrieval via search interface. More specifically, internet search engines allow users to search for documents by submitting queries including one or more keywords. Normally, search engines parse submitted queries and find result documents that prominently feature the keywords included in the query. Upon identifying one or more result documents, internet search engines present the result documents to a user for review and selection.

SUMMARY

According to various aspects and embodiments, a system is configured to discover, store, and utilize associated words to enhance search accuracy. More specially, in some embodiments, the system executes an associative search that uncovers relationships between terms through document comparison and analysis. Once these relationships are surfaced, the system records the related terms and subsequently executes search queries utilizing the related terms. These subsequently executed search queries may result in additional documents relevant to a primary search query.

As described in detail below, in some embodiments, the system is configured to perform this analysis in near real-time. In these embodiments the system executes an associative search process that innovatively utilizes artifacts created during conventional search engine processing to identify secondary terms within documents that may be related to terms specified within the primary search query. These artifacts include both scores that indicate the relevancy of identified documents and the terms in the document that contributed to these scores. The associative search may evaluate one or more rules and parameters to determine whether these terms should be recorded as a related term. Further, as described below, the associative search may evaluate additional rules to determine whether and how many documents to analyze for related terms and how many related terms to record.

According to at least one embodiment, a computer system is provided. The computer system includes a memory, at least one processor coupled to the memory, and a search component executable by the at least one processor. The search component is configured to receive information descriptive of at least one search term; execute a first query against a plurality of documents that identifies at least one first document of the plurality of documents responsive to the at least one search term, wherein the at least one document includes the at least one search term; identify one or more secondary terms associated with the at least one first document based on occurrence of the one or more secondary terms within the at least one first document; and provide a search result including at least one of the one or more secondary terms and one or more identifiers of one or more documents including the one or more secondary terms.

In the computer system, the at least one first document may include a plurality of documents, the memory may be configured to store a configurable parameter specifying a maximum number of documents, and the search component may be further configured to limit the plurality of documents to a number of documents having a predefined relationship with the configurable parameter. The at least one first document may be an email or an attachment to an email. The one or more secondary terms may include a plurality of secondary terms, the memory may be configured to store a configurable parameter specifying a maximum number of secondary terms, and the search component may be further configured to limit the plurality of secondary terms to a number of secondary terms having a predefined relationship with the configurable parameter. The search result may include at least one identifier of a bookmarked document. The search result may include an identifier of an email or an attachment of an email. The bookmarked document may include an email or an attachment of an email.

In the computer system, the one or more secondary terms may include a plurality of secondary terms and the search component may be further configured to score each secondary term of the plurality of secondary terms according to a frequency with which each secondary term occurs within the at least one first document. The search component may be configured to score each secondary term using at least one of a term frequency-inverse document frequency process and an Okapi BM25 process. The search component may be configured to score secondary terms using other processes.

The computer system may further comprise an interface component configured to display each secondary term of the plurality of secondary terms sorted by score within the search result. The interface component may be further configured to receive information identifying at least one secondary term of the plurality of secondary terms; and identify, responsive to receiving the information identifying the at least one secondary term, one or more additional documents including the at least one secondary term.

In the computer system, the one or more documents may include one or more seed documents and the search component may be further configured to identify at least one seed document of the one or more seed documents; identify at least one additional secondary term associated with the at least one seed document based on occurrence of the at least one additional secondary term within the at least one seed document; identify one or more additional documents including the at least one additional secondary term; and provide the one or more additional documents within the search result. The interface component may be configured to receive information selecting the at least one seed document.

According to another embodiment, a method of executing an associative search using a computer system including memory and at least one processor coupled to the memory is provided. The method includes acts of receiving, by the computer system, information describing at least one search term; executing, by the computer system, a first query against a plurality of documents that identifies at least one first document of the plurality of documents responsive to the at least one search term, wherein the at least one document includes the at least one search term; identifying, by the computer system, one or more secondary terms associated with the at least one first document based on occurrence of the one or more secondary terms within the at least one first document; and providing, by the computer system, a search result including at least one of the one or more secondary terms and one or more identifiers of one or more documents including the one or more secondary terms.

In the method, the at least one first document may include a plurality of documents, the memory may be configured to store a configurable parameter specifying a maximum number of documents, and the method may further include an act of limiting the plurality of documents to a number of documents having a predefined relationship with the configurable parameter. The predefined relationship may be an equality or an inequality. The one or more secondary terms may include a plurality of secondary terms, the memory may be configured to store a configurable parameter specifying a maximum number of secondary terms, and the method may further include an act of limiting the plurality of secondary terms to a number of secondary terms having a predefined relationship with the configurable parameter. The act of providing the search result may include an act of providing at least one identifier of a bookmarked document. The one or more secondary terms may include a plurality of secondary terms and the method may further include an act of scoring each secondary term of the plurality of secondary terms according to a frequency with which each secondary term occurs within the at least one first document. The act of scoring each secondary term may include an act of scoring each secondary term using at least one of a term frequency-inverse document frequency process and an Okapi BM25 process. Secondary terms may be scored using other processes.

The method may further include an act of displaying the plurality of secondary terms sorted by score within the search result. The method may also further include acts of receiving information identifying at least one secondary term of the plurality of secondary terms; and identifying, responsive to receiving the information identifying the at least one secondary term, one or more additional documents including the at least one secondary term.

In the method, the one or more documents may include one or more seed documents and the method may further include acts of identifying at least one seed document of the one or more seed documents; identifying at least one additional secondary term associated with the at least one seed document based on occurrence of the at least one additional secondary term within the at least one seed document; identifying one or more additional documents including the at least one additional secondary term; and providing the one or more additional documents within the search result. The act of identifying the at least one seed document may include an act of identifying the at least one seed document in response to receiving information selecting the at least one seed document.

According to another embodiment, a non-transitory computer readable medium is provided. The computer readable medium stores instructions executable by at least one processor to execute an associative search method. The instructions instruct the at least one processor to receive information describing at least one search term; execute a first query against a plurality of documents that identifies at least one first document of the plurality of documents responsive to the at least one search term, wherein the at least one document includes the at least one search term; identify one or more secondary terms associated with the at least one first document based on occurrence of the one or more secondary terms within the at least one first document; and provide a search result including at least one of the one or more secondary terms and one or more identifiers of one or more documents including the one or more secondary terms.

According to the computer readable medium, the at least one first document may include a plurality of documents and the instructions may further instruct the at least one processor to limit the plurality of documents to a number of documents having a predefined relationship with a configurable parameter specifying a maximum number of documents. The one or more secondary terms may include a plurality of secondary terms and the instructions may further instruct the at least one processor to limit the plurality of secondary terms to a number of secondary terms having a predefined relationship with a configurable parameter specifying a maximum number of secondary terms. The instructions that instruct the at least one processor to provide the search result may include instructions that instruct the at least one processor to provide at least one identifier of a bookmarked document.

According to the computer readable medium, the one or more secondary terms may include a plurality of secondary terms and the instructions may further instruct the at least one processor to score each secondary term of the plurality of secondary terms according to a frequency with which each secondary term occurs within the at least one first document. The instructions that instruct the at least one processor to score each secondary term may include instructions that instruct the at least one processor to score each secondary term using at least one of a term frequency-inverse document frequency process and an Okapi BM25 process. The instructions may instruct the at least one processor to score secondary terms using other processes. The instructions may further instruct the at least one processor to display the plurality of secondary terms sorted by score within the search result.

According to the computer readable medium, the instructions may further instruct the at least one processor to receive information identifying at least one secondary term of the plurality of secondary terms and identify, responsive to receiving the information identifying the at least one secondary term, one or more additional documents including the at least one secondary term.

According to the computer readable medium, the one or more documents may include one or more seed documents and the instructions may further instruct the at least one processor to identify at least one seed document of the one or more seed documents; identify at least one additional secondary term associated with the at least one seed document based on occurrence of the at least one additional secondary term within the at least one seed document; identify one or more additional documents including the at least one additional secondary term; and provide the one or more additional documents within the search result. The instructions may further instruct the at least one processor to receive information identifying the at least one seed document and the instructions that instruct the at least one processor to identify the at least one seed document may include instructions that instruct the at least one processor to identify the at least one seed document in response to receiving the information identifying the at least one seed document.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
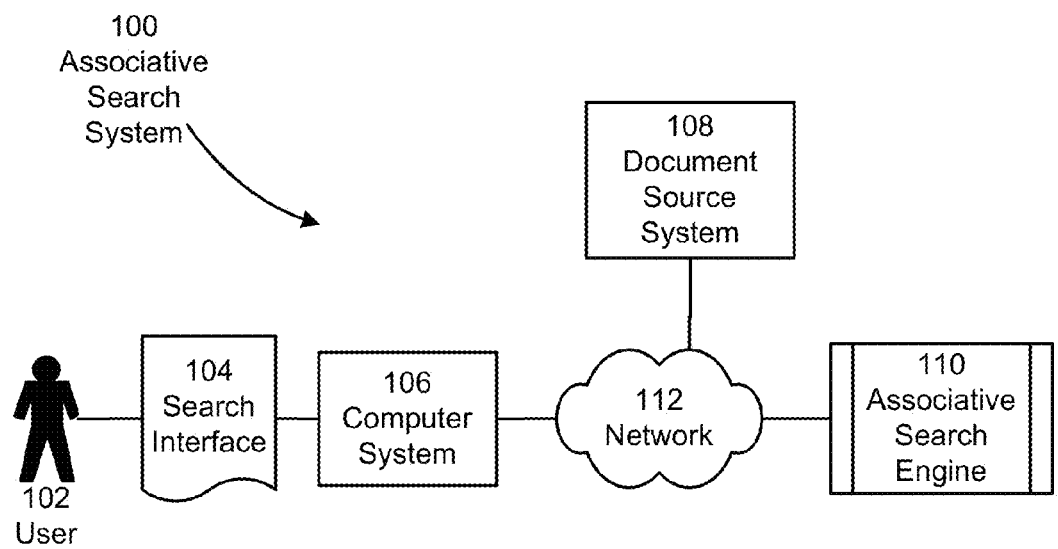
FIG. 1 is a block diagram including a system for executing associative searches.

Some embodiments disclosed herein include apparatus and processes for discovering associations between terms based on their coincidence within one or more documents. For example, according to one embodiment, a computer system is configured to provide an interface through which the computer system receives a search query including one or more terms of interest to an external entity, such as a user or remote computer system. In response to receipt of the search query, the computer system processes the search query by executing a search engine that parses the search query and identifies one or more documents that are relevant to the search terms included in the search query. In addition, the search engine identifies one or more secondary terms derived from terms that occur frequently within the one or more identified documents and executes additional search queries using the secondary terms as search terms. In these embodiments, the search engine provides links or other indicia of the one or more identified documents, secondary terms, and results of the additional search queries to the external entity as search results.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Associative Search System

Various embodiments utilize one or more specially configured computer systems to execute associative searches and provide associative search results. FIG. 1 illustrates one of these embodiments, an associative search system 100. As shown, FIG. 1 includes a user 102, a search interface 104, a computer system 106, a document source system 108, an associative search engine 110, and a communication network 112. The computer system 106, the document source system 108, the associative search engine 110, and the communication network 112 may include one or more computer systems, such as the computer system described below with reference to FIG. 6. As illustrated in FIG. 1, the computer system 106, the document management system 108, and the associative search engine 110 exchange (e.g., send or receive) information via the network 112. The network 112 may include any communication network through which devices may exchange information. For example, the network 110 may be a public network, such as the Internet, and may include other public or private networks such as LANs, WANs, extranets, intranets, and cloud computing systems. The network 110 may also include cellular networks such as CMDA, EvDO, GSM, and iDEN networks.

According to various embodiments, the associative search system 100 is configured to receive and execute associative search queries directed to a corpus of documents. In these embodiments, the associative search system 100 is configured to provide results from executed associative search queries to external entities, such as the user 102, via one or more interfaces. For example, in some embodiments in accord with FIG. 1, the associative search engine 110 is configured to provide the search interface 104 to the user 102 via the computer system 106 and the network 112. In some embodiments illustrated by FIG. 1, the search interface 104 is a browser-based user interface served by associative search engine 110. In other embodiments, the search interface 104 is a specialized client program that executes outside of a browser environment, such as an application program executing on a mobile device.

Figure 3:
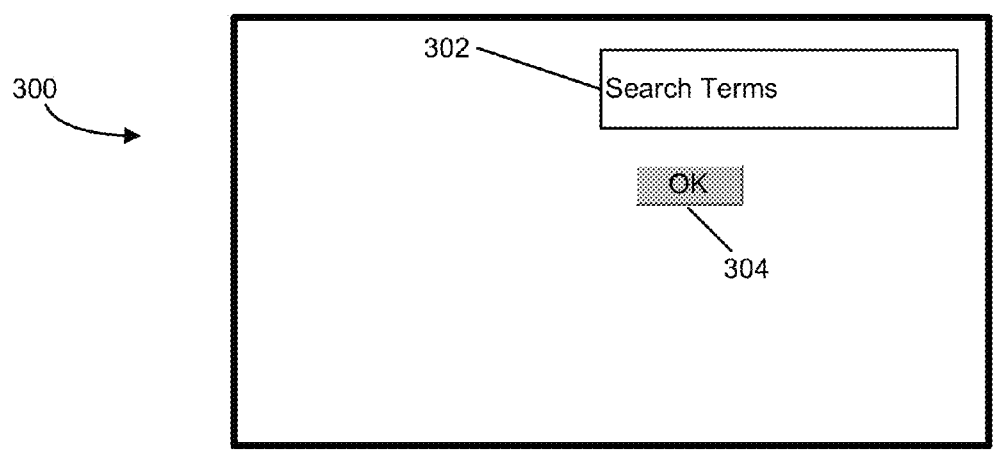
FIG. 3 is a schematic diagram of a search interface.

The search interface 104 may include various interface elements (e.g., screens, windows, buttons, boxes, and other elements) arranged according to a variety of designs and metaphors. For example, in some embodiments, the search interface 104 includes interface elements that exchange information with the user 102 to allow the user 102 to search for, select, and review one or more documents from the corpus of documents. For instance, FIG. 3 illustrates one example in which the search interface 104 presents a screen 300 with interface elements that receive input from the user 102. As shown in FIG. 3, the screen 300 includes a text box 302, and an ok button 304. In this embodiment, these elements are configured to operate as follows. The text box 302 receives input specifying a search query. The search query includes one or more search terms (e.g., words, phrases, and other syntactical constructs) descriptive of documents targeted by the search query. The ok button 304 is configured to initiate execution of the search query in response to being actuated by the user 102.

In one embodiment, in response to receiving input specifying a search query (e.g., population of the text box 302 and actuation of the ok button 304), the search interface 104 transmits information descriptive of the search query to the associative search engine 110. In this embodiment, the associative search engine 110 is configured to process this information to execute the search query with reference to the corpus of documents. The associative search engine 110 is also configured to generate a primary search result. Processes that the associative search engine 110 is configured to execute during execution of the search query and generation of the search result are described further below with reference to FIGS. 7, 8, 10, and 11.

The corpus of documents searched via the search query may be stored in a variety of formats at various locations. For instance, in at least one embodiment, the corpus of documents includes email and email attachments stored within a database controlled by the associative search engine 110. In this embodiment, the associative search engine 110 is configured to import the corpus from the document source system 108 via the network 112. In other embodiments in accord with FIG. 1, the corpus of documents is stored in the document source system 108. Thus embodiments are not limited to a particular corpus of documents stored at any particular location.

Figure 4:
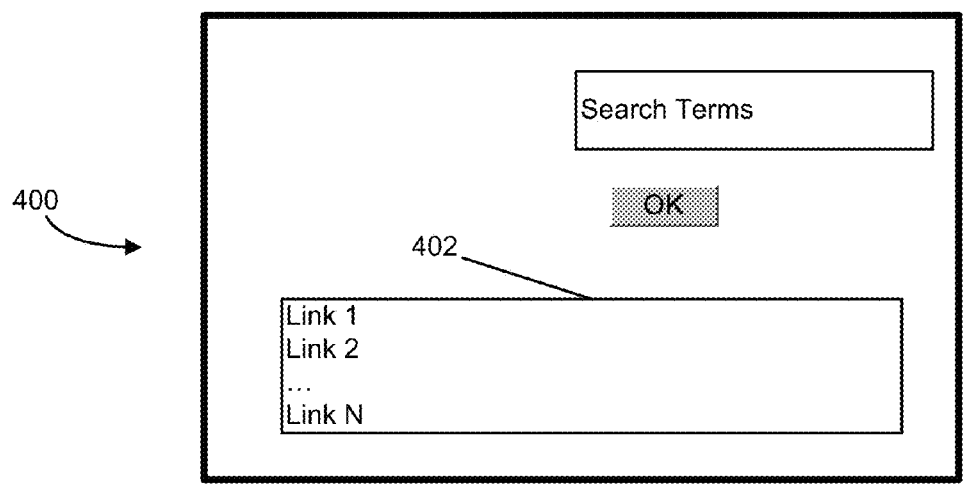
FIG. 4 is a schematic diagram of a search interface including search results.

In one embodiment, the associative search engine 110 transmits information descriptive of the primary search result to the search interface 104. This information may include navigable links to documents determined to be relevant to the search query. These links may include hyperlinks that lead to documents stored in the associative search engine 110, the document source system 108, or elsewhere. FIG. 4 illustrates one example in which the search interface 104 presents a screen 400 with interface elements that provide navigable links to documents included in the primary search result. As shown in FIG. 4, the screen 400 includes, in addition to the elements described above with reference to FIG. 3, a link area 402 that includes links to documents included in the primary search result. In this embodiment, the user 102 may navigate to a particular document by actuating a link associated with the document.

In some embodiments, the associative search engine 110 is configured to discover, after generating the primary search result, one or more secondary terms that are correlated to the one or more search terms within documents identified in the primary search result or previously associated (e.g., bookmarked) with the search query. In at least some embodiments, the associative search engine 110 discovers correlated secondary terms using a process that scores secondary terms based on the frequency with which the secondary terms occur within bookmarked documents and documents identified in primary search result. Examples of this scoring process may be based on a term frequency-inverse document frequency process, an Okapi BM25 process, or a similar process. Examples of processes executed by the associative search engine 110 to discover secondary terms are described further below with reference to FIG. 9.

After discovering one or more secondary terms, various embodiments utilize these secondary terms in a variety of ways. For example, some embodiments are configured to store the secondary terms and to execute a secondary search query including the secondary terms in response to receiving input indicating interest in a particular document identified in the primary search results, such as by actuating a link included in the link area 402. This secondary search query may include one or more secondary terms as search terms.

Figure 5:
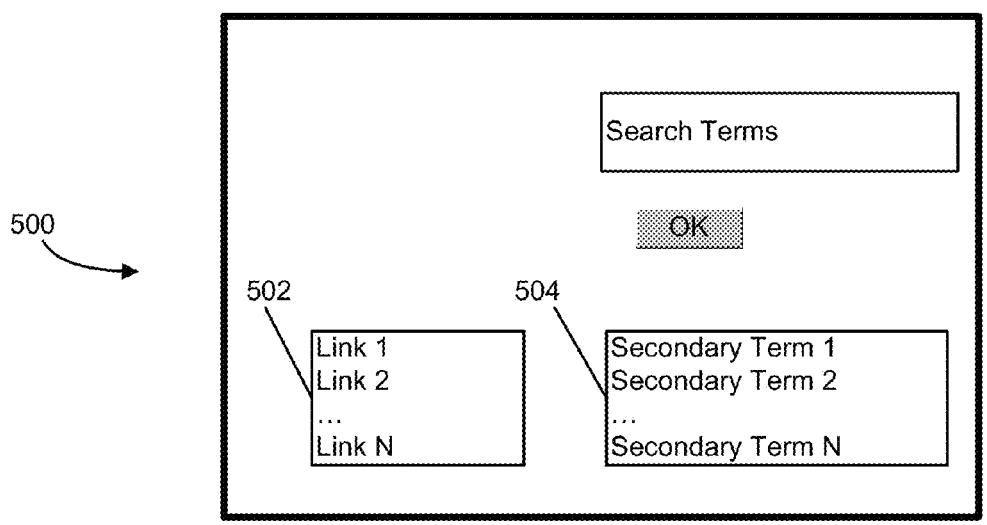
FIG. 5 is a schematic diagram of another search interface including search results.

Other embodiments present the secondary terms within the primary search result to enable an external entity to conduct a secondary search query using the secondary terms as search terms. FIG. 5 illustrates one example in which the search interface 104 presents a screen 500 with interface elements that provide secondary terms within the primary search result. As shown in FIG. 5, the screen 500 includes, in addition to the elements described above with reference to FIG. 3, a link area 502 and a secondary term area 504. The link area 502 includes links to documents included in the primary search result. The secondary term area 504 includes a listing of secondary terms found within one or more of the documents included in the primary search result. In this embodiment, the user 102 may navigate to a particular document by actuating a link associated with the document. Further, the user 102 may initiate a secondary search for one or more secondary terms by entering the secondary terms in the text box 302 or by actuating one or more of the secondary terms listed in the secondary terms area 504.

Still other embodiments execute secondary search queries automatically (e.g., after identifying the secondary terms and without requiring further user input). These embodiments may present, within the primary search results (e.g., as shown in the link area 402), navigable links to secondary documents identified within secondary search results generated by execution of a secondary search query specifying the secondary terms as search terms.

As further illustrated in FIG. 1, the associative search engine 110 is configured to exchange information with the document source system 108 via the network 112. In some embodiments, the associative search engine 110 uses this information to create and maintain information descriptive of documents available for search. For instance, in at least one embodiment, the associative search engine 110 creates and maintains an index and a document store controlled by the associative search engine 110. One such embodiment is described further below with reference to FIG. 2.

The information exchanged between the associative search engine 110 and the document source system 108 may include requests and responses for document content or document metadata (e.g., name, storage location, size, and other document characteristics). To exchange information with the document source system 108, the associative search engine 110 generates and transmits messages to the document source system 108 that are formatted according to a protocol supported by the document source system 108. Responsive to receiving a response to a request for document content or document metadata, the associative search engine 110 may store or otherwise process the response to create and maintain document information that is local to the associative search engine 110. Examples of document source system include content management systems, news and reference article repositories, and email systems.

For instance, in at least one embodiment, the document source system 108 is an Outlook/Exchange® email system, available from Microsoft of Redmond, Wash. In this embodiment, the associative search system 100 searches a corpus of documents that includes email and email attachments. Also, in this embodiment, the associative search system 100 provides an interface that locates email and email attachments more effectively than conventional email management systems by executing the associative search processes described herein.

Information may flow between the components illustrated in FIG. 1, or any of the elements, components and subsystems disclosed herein, using a variety of techniques. Such techniques include, for example, passing the information over a network using standard protocols, such as TCP/IP or HTTP or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Associative Search Engine

Figure 2:
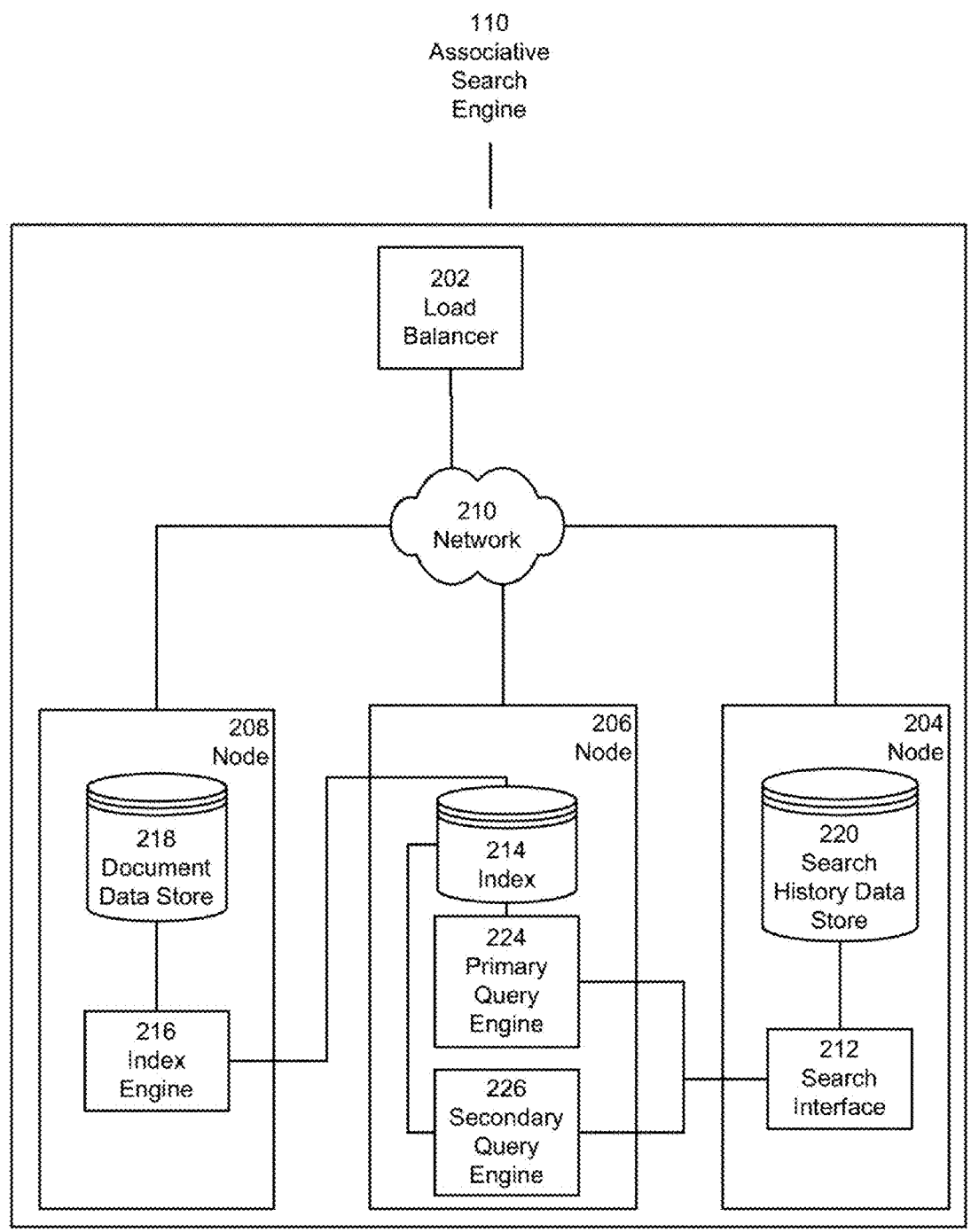
FIG. 2 is a schematic diagram of an associative search engine.

The associative search engine 110 may be arranged according to a variety of architectures. FIG. 2 illustrates one such architecture in which the physical and logical components of the associative search engine 110 are configured as a distributed system. The architecture illustrated in FIG. 2 is provided for example purposes only and embodiments disclosed herein are not limited to the architecture shown in FIG. 2.

As shown in FIG. 2, the associative search engine 110 includes five primary physical elements: a load balancer 202, nodes 204, 206, and 208, and a network 210. The node 204 includes a search interface 212 and a search history data store 220. The node 206 includes a primary query engine 224, secondary query engine 226, and an index 214. The node 208 includes an index engine 216 and a document data store 218. The load balancer 202 and each of the nodes 204, 206, and 208 may include one or more computer systems as described below with reference to FIG. 6. Further, in some embodiments, each of the nodes 204, 206, and 208 is a cluster implemented using Hadoop®, which is available from the Apache Software Foundation of Forest Hills, Md., or a similar software package.

In one embodiment illustrated by FIG. 2, the load balancer 202 provides load balancing services to the other components of associative search engine 110. The nodes 204, 206, and 208 provide computing resources to various processes executed by the associative search engine 100. For example, each of the nodes 204, 206, and 208 provides data storage and retrieval functionality to locally and remotely executing processes. In addition, the node 204 implements web server functionality in support of the search interface 212. This web server functionality may serve content using any suitable protocol including, among others, HTTP, SMTP, IMAP, and POP, and any suitable data formatting standard including, among others, HTML, DHTML, XML and MIME. Like the network 112 described above with reference to FIG. 1, the network 210 may include any communication network through which member computer systems may exchange data.

In some embodiments, the node 204 implements the search interface 212 and the search history data store 220. The search interface 212 is configured to exchange information with a variety of external entities, such as users or external systems. For example, according to one embodiment, the search interface 212 serves a browser-based user interface to the user 102 that is rendered as the search interface 104 by a web browser executing on the computer system 106. In other embodiments, the search interface 212 implements a system interface that exchanges information with external systems according to a predefined protocol. For example, in some embodiment, the search interface 212 exchanges data with specialized client programs executing on remote systems, such as the computer system 106.

In one embodiment, the search interface 212 is configured to receive information descriptive of search queries from the search interface 104 and to provide information descriptive of search results to the search interface 104. This information descriptive of search queries may include search terms included in the search query, ordinal values of search terms within the search query, and indications of which search terms or sequences of search terms are required to be present in (or absent from) a document for the document to be identified as relevant and included in the search results. The search results may include links, identifiers, and locations of documents identified as relevant to a search query (e.g. bookmarked documents previously associated with the search query, documents included in primary search results, and documents included in secondary search results). As described further below, the search results may also include secondary terms from the bookmarked documents and the documents included in primary search results.

According to one embodiment illustrated by FIG. 2, the search interface 212 is configured to exchange information with the primary query engine 224. The information exchanged between the search interface 212 and the primary query engine 224 may include query execution requests and query execution responses. To exchange query execution requests and query execution responses with the primary query engine 224, the search interface 212 generates and transmits messages to the primary query engine 224 that are formatted according to a protocol supported by the primary query engine 224. In response to receiving a query execution response to a query execution request, the search interface 212 may store or otherwise process the query execution response by providing search results to an external entity, such as the search interface 104, as described above. Examples of processes executed by the search interface 212 that interoperate with the primary query engine 224 are described further below with reference to FIG. 7.

In another embodiment illustrated by FIG. 2, the search interface 212 is configured to exchange information with the secondary query engine 226. The information exchanged between the search interface 212 and the secondary query engine 226 may include document harvesting requests and document harvesting responses. In some embodiments, document harvesting requests include information descriptive of one or more seed documents that have been identified as being relevant to a search query (e.g., bookmarked documents or documents referenced in primary search results). In these embodiments, document harvesting responses include search results for search queries executed using terms harvested from the seed documents identified in the corresponding document harvesting request.

To exchange document harvesting requests and document harvesting responses with the secondary query engine 226, the search interface 212 generates and transmits messages to the secondary query engine 226 that are formatted according to a protocol supported by the secondary query engine 226. In response to receiving a document harvesting response to a document harvesting request, the search interface 212 may store or otherwise process the document harvesting response by providing search results included in the document harvesting response to an external entity, such as the search interface 104, as described above. Examples of processes executed by the search interface 212 that interoperate with the secondary query engine 226 are described further below with reference to FIG. 7.

In some embodiments, the primary query engine 224 is configured to process query execution requests. These query execution requests may include information descriptive of one or more search queries, as described above. In at least one embodiment, in response to receiving a query execution request, the primary query engine 224 identifies one or more documents satisfying the query execution request using the index 214. More particularly, in embodiments where the index 214 is an inverted index, the primary query engine 224 searches the inverted index 214 for documents having characteristics specified by the query execution request. Examples of these characteristics include keywords, phrases, and other portions of documents that fully or partially match search terms included within the query execution request. In response to identifying documents that satisfy the query execution request, the primary query engine 224 retrieves information descriptive of the identified documents from the index 214 and transmits a query execution response including this information to the search interface 212. Examples of this information include identifiers and locations of the documents. Examples of processes executed by the primary query engine 224 relative to the index 214 are described further below with reference to FIG. 8.

In various embodiments, the secondary query engine 226 is configured to process document harvesting requests. These document harvesting requests may include information descriptive of one or more seed documents, as described above. In at least one embodiment, in response to receiving a document harvesting request, the secondary query engine 226 identifies secondary terms included within one or more seed documents identified in the document harvesting request. Examples of processes executed by the secondary query engine 226 to identify secondary terms included within seed documents are described further below with reference to FIG. 9. After identifying these secondary terms, the secondary query engine 226 executes a secondary search query using these secondary terms. Examples of processes executed by the secondary query engine 226 to execute a secondary search query are described further below with reference to FIG. 8.

Thus, in some embodiments, the secondary query engine 226 identifies one or more documents from the index 214 using the secondary terms identified from the seed documents. More particularly, in embodiments where the index 214 is an inverted index, the secondary query engine 226 searches the inverted index 214 for documents having characteristics specified by the harvested secondary terms. Examples of these characteristics include keywords, phrases, and other portions of documents that fully or partially match the secondary terms. In response to identifying documents that satisfy the document harvesting request, the secondary query engine 226 retrieves information descriptive of the identified documents from the index 214 and transmits a document harvesting response including this information to the search interface 212.

According to some embodiments, the search interface 212 is configured to store and retrieve information descriptive of the search activities conducted by users in the search history data store 220. For example, in one embodiment, the search interface 212 stores a detailed audit trail of the search activities conducted by individual, identified users. These audit trails may include an exhaustively complete chronology of each user's interaction with the associative search engine 110, or portions thereof. Thus, audit trails may include information descriptive of one or more search queries conducted by the user, manipulation of search results corresponding to the search queries (e.g., results selected and bookmarked by the user, follow-up search queries input by the user, time spent reviewing search results or documents cited in search results, etc.). As described further below with reference to FIG. 9, in some embodiments, the search engine 212 analyzes audit trails to enhance the relevance of search results presented to individual users based on inclinations demonstrated within audit trails associated with the user or a group of users.

According to at least one embodiment, the search history data store 220 is configured to store information descriptive of search activities conducted by users. This information may include audit trails associated with individual users, as described above.

In some embodiments, the node 206 implements the primary query engine 224, the secondary query engine 226, and the index 214. The index 214 stores a variety of information related to documents that are searchable via the associative search engine 110. Examples of this information include document characteristics such as keywords, phrases and other portions of documents. In some embodiments, the index 214 may organize the full text of each document, or portions thereof, into an inverted index to enable keywords, phrases, and other syntactical constructs to be used to identify documents efficiently.

Referring again to FIG. 2, the node 208 implements the index engine 216 and the document data store 218. The index engine 216 is configured to perform a variety of processes that create and maintain (e.g., insert, remove, or modify) information stored in the index 214. In some embodiments, the index engine 216 maintains the index 214 by accessing and processing data stored in the document data store 218.

In some embodiments, the document data store 218 is configured to retrieve and store information descriptive of documents that are searchable via the associative search engine 110. For instance, in at least one embodiment, the document data store 218 includes executable components configured to retrieve information from a document source system, such as the document source system described above with reference to FIG. 1. Examples of the information retrieved and stored within the document data store 218 include complete copies of the documents and metadata descriptive of the documents (e.g., bibliographic information, versioning information, origin, date of creation, date of last modification, etc.). The complete copies of the documents may include the full text of the document, partitioned portions of the document (e.g., abstract, forwards or other commentary, etc.), and non-textual document components (e.g., images, audio information, attachments to the document, etc.). In at least one embodiment, the document data store 218 includes a repository of email and email attachments that is archived from one or more active email systems.

Data stores within the associative search engine 110, such as the index 214, the document data store 218, and the search history data store 220 may take the form of any logical construction capable of storing information on a computer readable medium including flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Embodiments of the associative search system 100 are not limited to the particular configuration illustrated in FIGS. 1 and 2. These configurations are included for the purposes of illustration only. It is to be appreciated that various examples and embodiments utilize a variety of hardware components, software components, and combinations of hardware and software components that are configured to perform the processes and functions described herein. In addition, in some embodiments, the hardware components described above may be virtualized. Thus the scope of the embodiments disclosed herein is not limited to a particular set of hardware, software, or a combination thereof.

Computer System

As discussed above with regard to FIGS. 1 and 2, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 6:
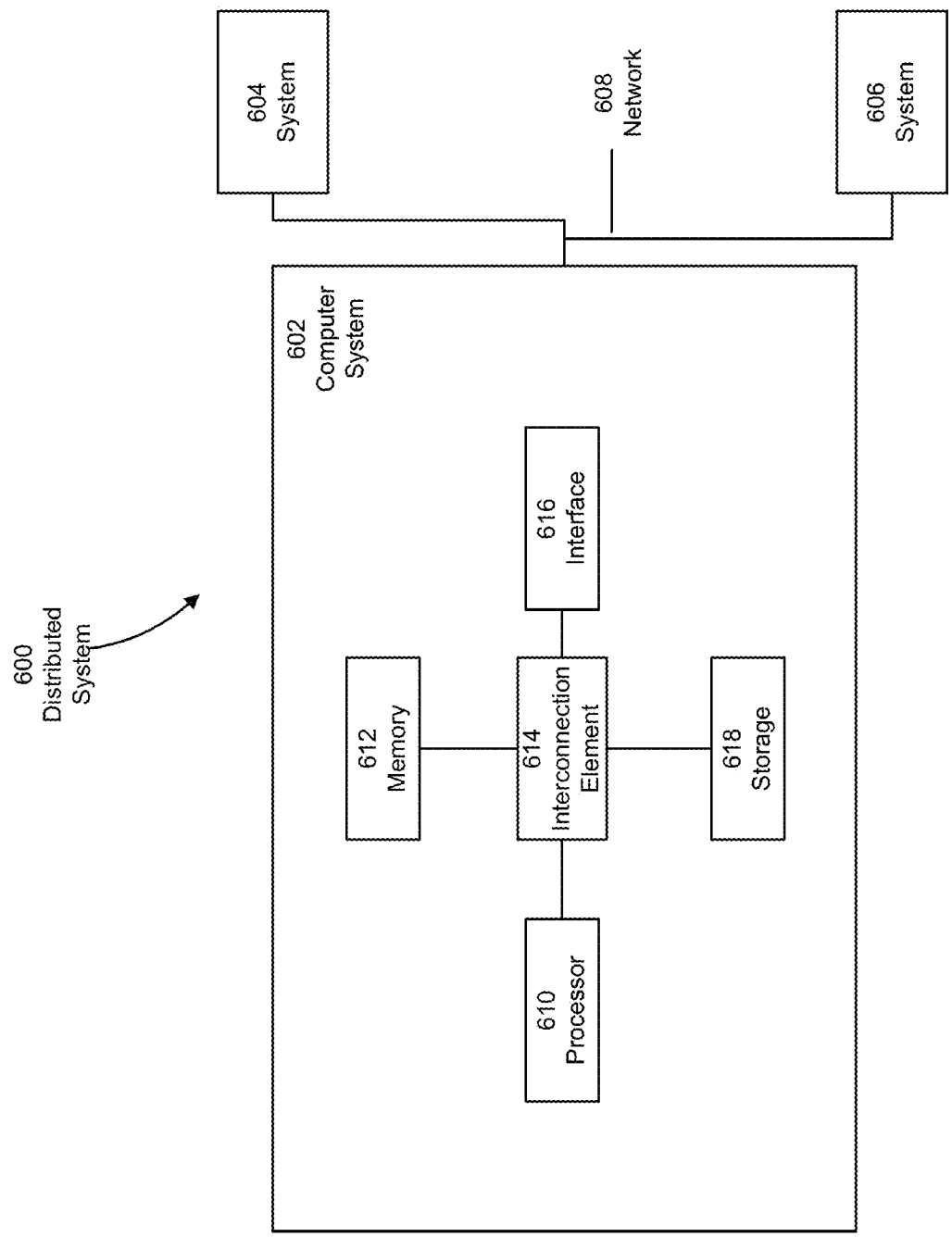
FIG. 6 is a schematic diagram of a computer system.

Referring to FIG. 6, there is illustrated a block diagram of a distributed computer system 600, in which various aspects and functions are practiced. As shown, the distributed computer system 600 includes one or more computer systems that exchange information. More specifically, the distributed computer system 600 includes computer systems 602, 604, and 606. As shown, the computer systems 602, 604, and 606 are interconnected by, and may exchange data through, a communication network 608. The network 608 may include any communication network through which computer systems may exchange data. To exchange data using the network 608, the computer systems 602, 604, and 606 and the network 608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 602, 604, and 606 may transmit data via the network 608 using a variety of security measures including, for example, SSL or VPN technologies. While the distributed computer system 600 illustrates three networked computer systems, the distributed computer system 600 is not so limited and may include any number of computer systems and computing devices, networked using any medium and communication protocol.

As illustrated in FIG. 6, the computer system 602 includes a processor 610, a memory 612, an interconnection element 614, an interface 616 and data storage element 618. To implement at least some of the aspects, functions, and processes disclosed herein, the processor 610 performs a series of instructions that result in manipulated data. The processor 610 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 610 is connected to other system components, including one or more memory devices 612, by the interconnection element 614.

The memory 612 stores programs (e.g., sequences of instructions coded to be executable by the processor 610) and data during operation of the computer system 602. Thus, the memory 612 may be a relatively high performance, volatile, random access memory such as a dynamic random access memory ("DRAM") or static memory ("SRAM"). However, the memory 612 may include any device for storing data, such as a disk drive or other nonvolatile storage device. Various examples may organize the memory 612 into particularized and, in some cases, unique structures to perform the functions disclosed herein. These data structures may be sized and organized to store values for particular data and types of data.

Components of the computer system 602 are coupled by an interconnection element such as the interconnection element 614. The interconnection element 614 may include any communication coupling between system components such as one or more physical busses in conformance with specialized or standard computing bus technologies such as IDE, SCSI, PCI and InfiniBand. The interconnection element 614 enables communications, including instructions and data, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and to communicate with external entities, such as users and other systems.

The data storage element 618 includes a computer readable and writeable nonvolatile, or non-transitory, data storage medium in which instructions are stored that define a program or other object that is executed by the processor 610. The data storage element 618 also may include information that is recorded, on or in, the medium, and that is processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller causes data to be read from the nonvolatile recording medium into another memory, such as the memory 612, that allows for faster access to the information by the processor 610 than does the storage medium included in the data storage element 618. The memory may be located in the data storage element 618 or in the memory 612, however, the processor 610 manipulates the data within the memory, and then copies the data to the storage medium associated with the data storage element 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having a different architectures or components than that shown in FIG. 6. For instance, the computer system 602 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Associative Search Processes

Figure 7:
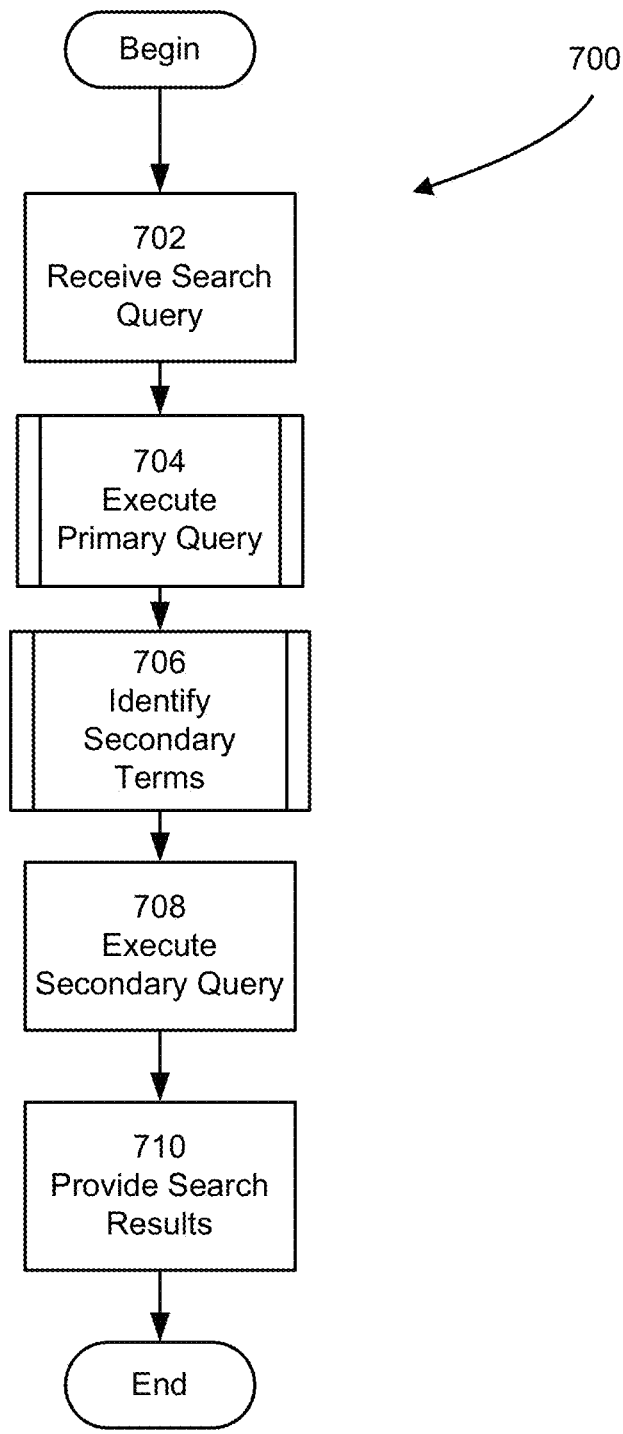
FIG. 7 is a flow diagram of a process for executing associative searches.

As described above with reference to FIGS. 1 and 2, several embodiments perform processes that execute associative searches. In some embodiments, these associative search processes are executed by an associative search system, such as the associative search system 100 described above with reference to FIG. 1. One example of such an associative search process is illustrated in FIG. 7. According to this example, the associative search process 700 includes acts of receiving a primary search query, executing the primary search query, identifying secondary terms from documents included in a primary search result generated by execution of the search query, executing an associative query, and providing search results.

In act 702, a search interface, such as the search interface 104 described above with reference to FIG. 1, of the associative search system receives a primary search query from an external entity, such as the user 102 described above with reference to FIG. 1. In one embodiment, the primary search query is received via a screen such as the screen 300 described above with reference to FIG. 3.

In act 704, an associative search engine of the associative search system, such as the associative search engine 110 described above with reference to FIGS. 1 and 2, executes the primary search query. Example processes performed within the act 704 are described further below with reference to FIG. 8.

In act 706, the associative search engine identifies secondary terms within one or more seed documents (e.g., documents identified as including secondary terms that may be discovered). The one or more seed documents processed in the act 706 may be automatically identified by the associative search engine after execution of a search query, such as the search queries executed in the act 704 or act 708. These seed document may also be identified within information (e.g., input) received from an external entity via the search interface, such as documents selected by the external entity within bookmarks, primary search results, or secondary search results. Example processes performed within the act 706 are described further below with reference to FIG. 9.

In the act 708, the associative search engine executes a secondary search query that includes one or more of the secondary terms as search terms. These secondary terms may be automatically identified in the act 706 or may be identified within information (e.g., input) received from an external entity via the search interface. In some embodiments the associative search system executes the secondary search query via the same process used to execute primary search query (e.g., the query execution process described below with reference to FIG. 8).

In the act 710, the associative search engine transmits search results to the search interface for presentation to the external entity. These search results may include results from the primary search query, the secondary search query, and documents previously associated with the search query (e.g. documents previously bookmarked). After completion of the act 710, the associative search system terminates the associative search process 700.

Processes in accord with the associative search process 700 surface associations between search terms and other syntactical constructs and utilizes these associations to enhance the relevance and utility of search results.

Figure 8:
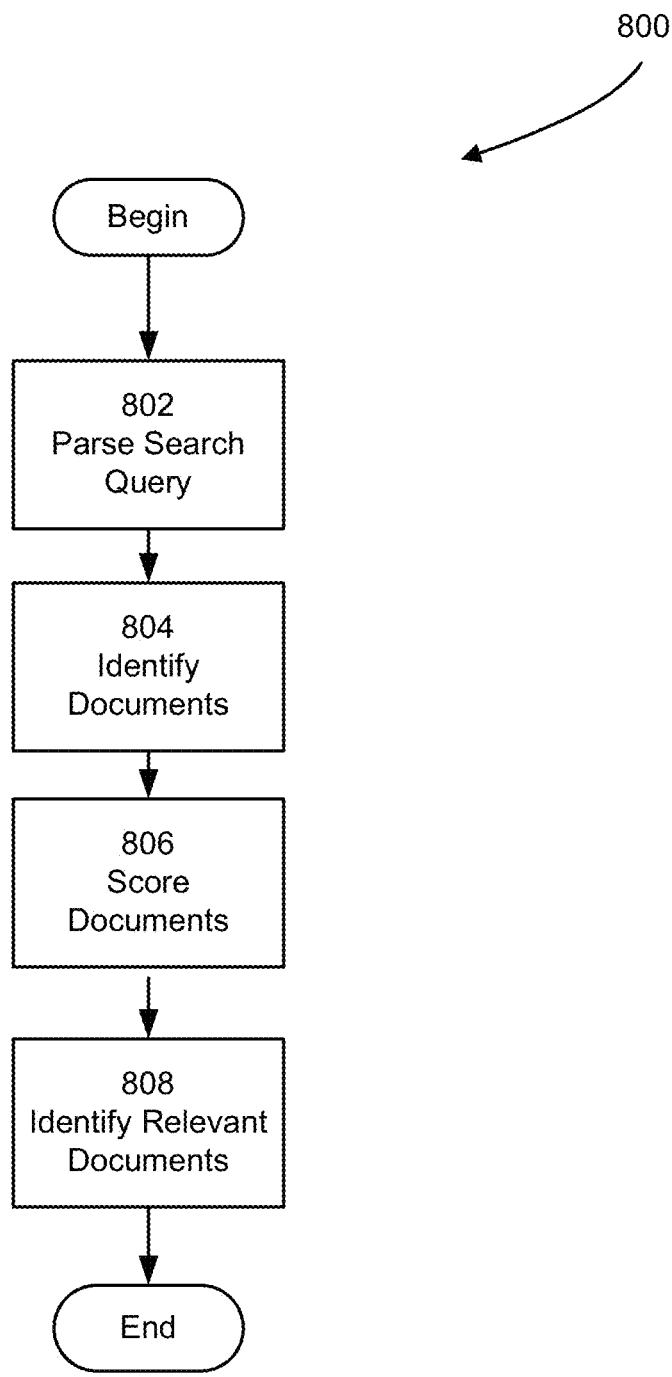
FIG. 8 is a flow diagram of a process for executing a search query.

As described above with reference to the act 704, some embodiments perform processes through which the associative search system executes a search query. One example of such a query execution process is illustrated in FIG. 8. According to this example, the query execution process 800 includes acts of parsing a search query, identifying documents that match the search query, scoring the relevancy of the documents, and identifying relevant documents.

In act 802, a query engine, such as the primary query engine 224 or the secondary query engine 226, described above with reference to FIG. 2, parses information descriptive of a search query to identify the search terms included within the search query. In some embodiments, the query engine filters stop words from the search terms. Examples of common stop words include articles (e.g., "the," "an," and "a,") prepositions (e.g., "at," "which," and "one") and other words with little power to aid the associative search engine in discriminating between documents relevant to the search query and documents not relevant to the search query.

In act 804, the query engine identifies one or more documents that include one or more of the search terms. In some embodiments, the query engine uses an inverted index, such as the index 214 described above with reference to FIG. 2, to identify the one or more documents.

In act 806, the query engine scores the set of documents against the filtered search terms to determine the relevancy of the documents to the search query. The query engine may execute a variety of scoring processes. Examples of the factors accounted for by some of these scoring processes include the presence or absence of particular search terms within the document, the frequency with which particular search terms occur within the document, and how closely the sequence of the search terms is mimicked within the document. Within embodiments directed toward email management systems, the factors accounted for may include the logical location of the search term within an email (e.g., whether the search term is disposed within the subject of an email, the body of an email, an attachment to the email, or elsewhere).

In act 808, the query engine identifies one or more documents associated with scores that are higher than scores of other documents. In some embodiments, the query engine limits the number of documents identified in the act 808 to a total that is less than a predefined, configurable parameter. After completion of the act 808, the associative search system terminates the query execution process 800.

Processes in accord with the query execution process 800 enable a search engine to identify one or more documents relevant to a search query.

Figure 9:
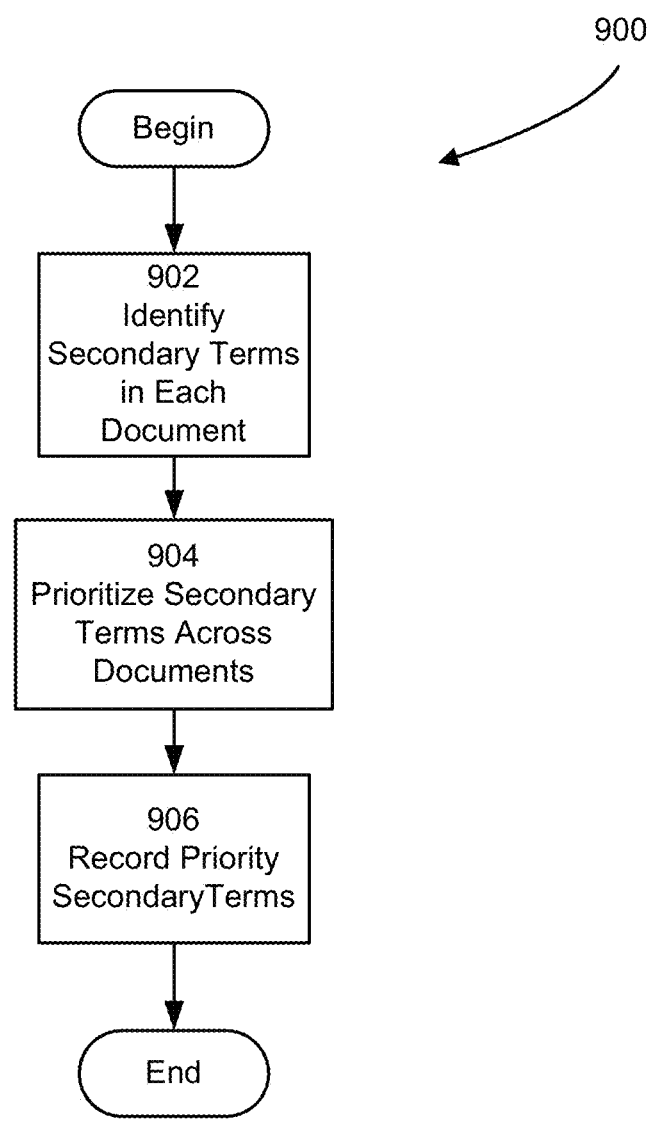
FIG. 9 is a flow diagram of a process for identifying secondary terms within a set of documents.

As described above with reference to the act 706, some embodiments perform processes through which the associative search system indentifies secondary terms within one or more documents. One example of such a term identification process is illustrated in FIG. 9. According to this example, the term identification process 900 includes acts of identifying secondary terms in each of one or more documents, prioritizing the secondary terms across documents, and recording priority secondary terms for subsequent processing.

In act 902, a secondary query engine, such as the secondary query engine 226 described above with reference to FIG. 2, of the associative search engine identifies secondary terms in each document. The secondary query engine may account for a variety of factors when determining a correlation between a search term and a secondary term in a document. Examples of these factors include the frequency with which the secondary term occur within the document, the proximity of secondary term relative to the search term within the document, the parts of speech embodied by the search term and the secondary term, and the proclivity of a user to select the secondary term as recorded in a search history for associated with the user (e.g., the user having previously bookmarked documents in association with the query that prominently include the secondary term). Within embodiments directed toward email management systems, the factors accounted for may include the logical location of the search term within an email (e.g., whether the search term is disposed within the subject of an email, the body of an email, an attachment to the email, or elsewhere). Further, when computing term correlation, various embodiments of the secondary query engine may weigh each of these factors differently.

It is to be appreciated that, in some embodiments, similarly of meaning is not a factor used to compute term correlation. However, in other embodiments, similarly of meaning may be a factor used to compute term correlation. For example, the secondary query engine 212 may increase the correlation for secondary terms that the secondary query engine is able to identify within a thesaurus as having a meaning similar to a search term.

In act 904, the secondary query engine prioritizes the secondary terms across the documents. In some embodiments, the secondary query engine limits the number of secondary terms identified and prioritized in the act 904 to a total that is less than a predefined, configurable parameter. In some embodiments, the secondary query engine prioritizes the secondary terms by ranking the secondary terms by correlation and selecting a number of highest ranking terms not to exceed the total specified by the configurable parameter.

In act 906, the secondary query engine records the highest priority secondary terms across the documents for subsequent processing. After recording the highest priority secondary terms across the documents, the secondary query engine terminates the term identification process 900.

Processes in accord with the term identification process 900 enable a computer system to determine associations between terms based on their coincidence within one or more documents or a pre-established association between the terms as recorded in search history.

Processes 700-900 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely an associative search system configured according to the examples and embodiments disclosed herein.

Usage Scenarios

Figure 10:
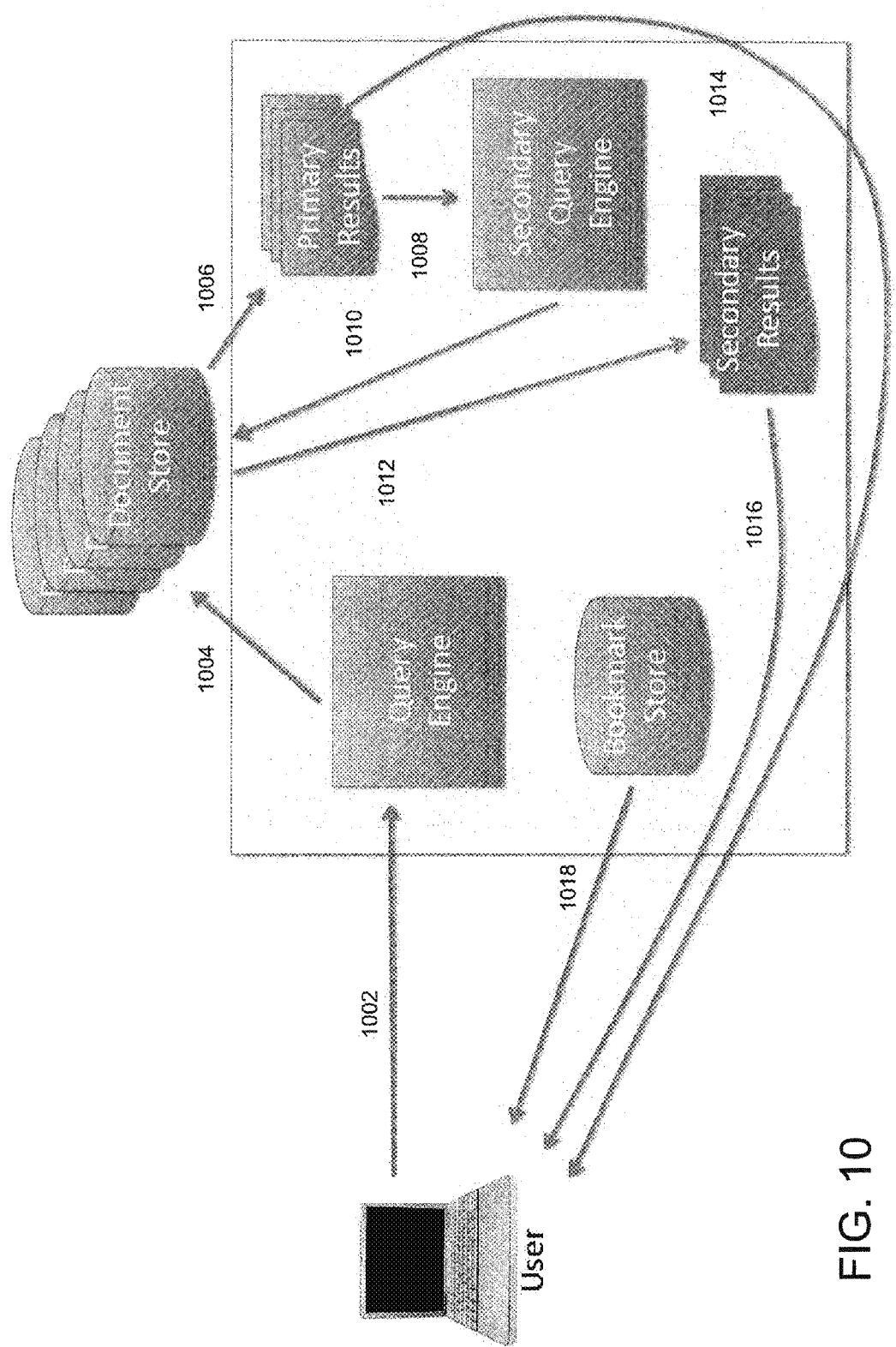
FIG. 10 is a sequence diagram illustrating an associative search process according to one embodiment.
Figure 11:
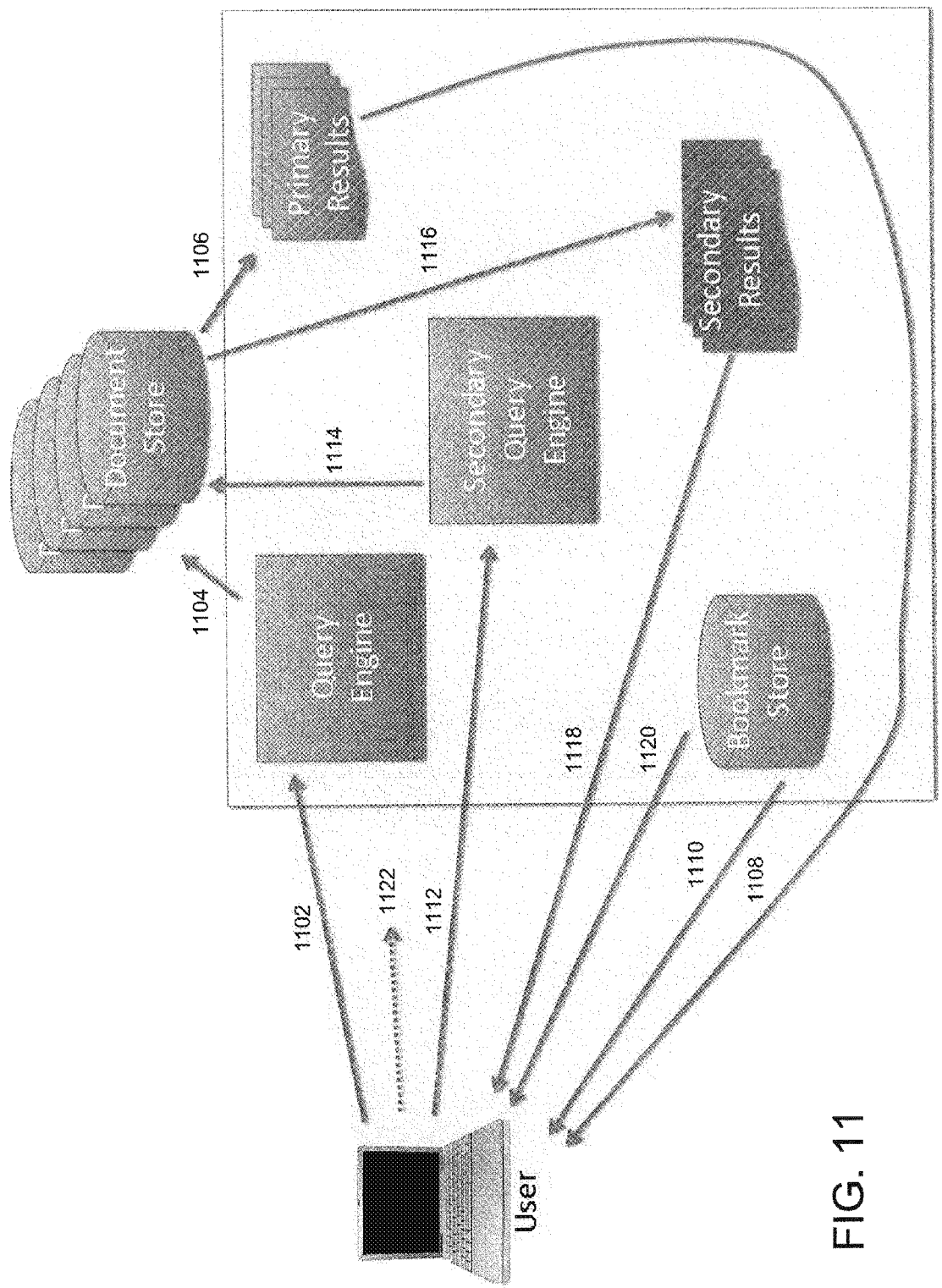
FIG. 11 is a sequence diagram illustrating another associative search process according to another embodiment.

FIGS. 10 and 11 illustrate particular examples of usage scenarios implemented by the embodiments disclosed herein. For example, FIG. 10 illustrates a sequence of events in which an associative search system, such as the associative search system 100 described above with reference to FIG. 1, executes an associative search without requiring a user, such as the user 102, to identify seed documents.

At 1002, the user submits a search query (e.g., "eggplant farming") to a query engine, such as the primary query engine 224 described above with reference to FIG. 2. In some examples, this submission initiates processes within a number of system components described above with reference to FIGS. 1 and 2. These components include the search interface 104, the computer system 106, the network 112, the associative search engine 110, and, more particularly, the search interface 212.

At 1004, the query engine searches the document store for documents relevant to the search query. At 1006, the query engine gathers primary search results of the search query. These primary search results include one or more seed documents relevant to the search query (e.g., documents which frequently and prominently feature the search term "eggplant farming").

At 1008, a search interface, such as the search interface 212 described above with reference to FIG. 2, provides one or more seed documents to a secondary query engine, such as the secondary query engine 226 described above with reference to FIG. 2. At 1010, the secondary query engine automatically identifies secondary terms from seed documents and searches the document store for documents relevant to the secondary terms. For example, the secondary query engine may identify terms such as "aubergine farming," "aubergine parasites," "aubergine pests," "aubergine diseases," "aubergine marketing," "aubergine boycott," "aubergine news," and "aubergine infestation," as occurring frequently enough within the seed documents to warrant additional searching and may execute a secondary search query specifying one or more of these secondary terms as the search terms.

At 1012, the secondary query engine gathers the secondary search results of the secondary search query. These secondary search results include one or more documents relevant to the secondary search query (e.g., documents which frequently and prominently feature one or more of the "aubergine" related secondary terms listed above). At 1014, 1016, and 1018, the search interface provides the primary search results (e.g., documents relevant to "eggplant farming"), the secondary search results (e.g., document relevant to one or more of the "aubergine" related secondary terms listed above), and any bookmarks associated with the search query to the user. In some examples, this presentation initiates processes within a number of system components described above with reference to FIGS. 1 and 2. These components include the network 112, the computer system 106, and the search interface 104.

FIG. 11 illustrates a sequence of events in which an associative search system, such as the associative search system 100 described above with reference to FIG. 1, executes an associative search in which a user, such as the user 102, to identifies seed documents.

At 1102, the user submits a search query (e.g., "eggplant farming") to a query engine, such as the primary query engine 224 described above with reference to FIG. 2. In some examples, this submission initiates processes within a number of system components described above with reference to FIGS. 1 and 2. These components include the search interface 104, the computer system 106, the network 112, the associative search engine 110, and, more particularly, the search interface 212.

At 1104, the query engine searches the document store for documents relevant to the search query. At 1106, the query engine gathers primary search results of the search query. These primary search results include one or more seed documents relevant to the search query (e.g., documents which frequently and prominently feature the search term "eggplant farming"). At 1108 and 1110, a search interface, such as the search interface 212 described above with reference to FIG. 2, provides the primary search results (e.g., documents relevant to "eggplant farming") and any bookmarks associated with the search query to the user. In some examples, this presentation initiates processes within a number of system components described above with reference to FIGS. 1 and 2. These components include the network 112, the computer system 106, and the search interface 104.

At 1112, the user provides an indication of one or more seed documents to a secondary query engine, such as the secondary query engine 226 described above with reference to FIG. 2. In some examples, this provision initiates processes within a number of system components described above with reference to FIGS. 1 and 2. These components include the search interface 104, the computer system 106, the network 112, the associative search engine 110, and, more particularly, the search interface 212.

At 1114, the secondary query engine automatically identifies secondary terms from the seed documents identified and searches the document store for documents relevant to the secondary terms. For example, the secondary query engine may identify terms such as "aubergine farming," "aubergine parasites," "aubergine pests," "aubergine diseases," "aubergine marketing," "aubergine boycott," "aubergine news," and "aubergine infestation," as occurring frequently enough within the seed documents to warrant additional searching and may execute a secondary search query specifying one or more of these secondary terms as the search terms.

At 1116, the secondary query engine gathers the secondary search results of the secondary search query. These secondary search results include one or more documents relevant to the secondary search query (e.g., documents which frequently and prominently feature one or more of the "aubergine" related secondary terms listed above). At 1118 and 1120, the search interface provides the secondary search results (e.g., document relevant to one or more of the "aubergine" related secondary terms listed above) and any bookmarks associated with the search query to the user. In some examples, this presentation initiates processes within a number of system components described above with reference to FIGS. 1 and 2. These components include the network 112, the computer system 106, and the search interface 104. At 1122, the user submits a refined search query to the query engine.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A computer system comprising:
a memory;
at least one processor coupled to the memory; and
a search component executable by the at least one processor and configured to:
receive information descriptive of at least one search term;
execute a first query against a plurality of documents that identifies at least two documents of the plurality of documents responsive to the at least one search term, wherein the at least two documents include the at least one search term;
automatically identify one or more secondary terms included within the at least two documents based on a correlation between the at least one search term and the one or more secondary terms included within the at least two documents, wherein the correlation is based on any one of: the parts of speech embodied by the at least one search term and the one or more secondary terms, the presence of the one or more secondary terms as recorded in a search history or a location of the at least one search term within an email;
rank the one or more secondary terms across the at least two documents based on the correlation;
record a subset of secondary terms, including one or more of the ranked secondary terms;
execute a second query against the plurality of documents using the recorded subset of secondary terms; and
provide, within a search result interface, a search result including the at least two documents from the first query including the recorded subset of secondary terms and one or more documents from the second query including the recorded subset of secondary terms.

2. The computer system of claim 1, wherein the at least two documents include a plurality of documents, the memory is configured to store a configurable parameter specifying a maximum number of documents, and the search component is further configured to limit the plurality of documents to a number of documents having a predefined relationship with the configurable parameter.

3. The computer system of claim 1, wherein the one or more secondary terms include a plurality of secondary terms, the memory is configured to store a configurable parameter specifying a maximum number of secondary terms, and the search component is further configured to limit the plurality of secondary terms to a number of secondary terms having a predefined relationship with the configurable parameter.

4. The computer system of claim 1, wherein the search result includes at least one identifier of a bookmarked document.

5. The computer system of claim 1, wherein the recorded subset of secondary terms includes a plurality of secondary terms and the search component is further configured to assign a frequency score to each secondary term of the plurality of secondary terms according to a frequency with which each secondary term occurs within the at least two documents.

6. The computer system of claim 5, wherein the search component is configured to assign a frequency score to each secondary term using at least one of a term frequency-inverse document frequency process and an Okapi BM25 process.

7. The computer system of claim 5, further comprising an interface component configured to display each secondary term of the plurality of secondary terms sorted by the frequency score within the search result.

8. The computer system of claim 7, wherein the interface component is further configured to:
receive information identifying at least one secondary term of the plurality of secondary terms; and
identify, responsive to receiving the information identifying the at least one secondary term, one or more additional documents including the at least one secondary term.

9. The computer system of claim 1, wherein the one or more documents include one or more seed documents and the search component is further configured to:
identify at least one seed document of the one or more seed documents;
identify at least one additional secondary term associated with the at least one seed document based on occurrence of the at least one additional secondary term within the at least one seed document;
identify one or more additional documents including the at least one additional secondary term; and
provide the one or more additional documents within the search result.

10. The computer system of claim 9, further comprising an interface component configured to receive information selecting the at least one seed document.

11. The computer system of claim 1, wherein the correlation is based on the location of the at least one search term within an email.

12. The computer system of claim 1, wherein the secondary terms are recorded based on evaluating a rule.

13. A method of executing an associative search using a computer system including memory and at least one processor coupled to the memory, the method comprising:
receiving, by the computer system, information describing at least one search term;
executing, by the computer system, a first query against a plurality of documents that identifies at least two documents of the plurality of documents responsive to the at least one search term, wherein the at least two documents include the at least one search term;
automatically identifying, by the computer system, one or more secondary terms included within the at least two documents based on a correlation between the at least one search term and the one or more secondary terms included within the at least two documents, wherein the correlation is based on any one of: the parts of speech embodied by the at least one search term and the one or more secondary terms, the presence of the one or more secondary terms as recorded in a search history or a location of the at least one search term within an email;
rank the one or more secondary terms across the at least two documents based on the correlation;
recording a subset of secondary terms, including one or more of the ranked secondary terms;
executing a second query against the plurality of documents using the recorded subset of secondary terms; and
providing, by the computer system within a search result interface, a search result including the at least two documents from the first query including the recorded subset of secondary terms and one or more documents from the second query including the recorded subset of secondary terms provided by the second query.

14. The method of claim 13, wherein the at least two documents include a plurality of documents, the memory is configured to store a configurable parameter specifying a maximum number of documents, and the method further comprises limiting the plurality of documents to a number of documents having a predefined relationship with the configurable parameter.

15. The method of claim 13, wherein the one or more secondary terms include a plurality of secondary terms, the memory is configured to store a configurable parameter specifying a maximum number of secondary terms, and the method further comprises limiting the plurality of secondary terms to a number of secondary terms having a predefined relationship with the configurable parameter.

16. The method of claim 13, wherein providing the search result includes providing at least one identifier of a bookmarked document.

17. The method of claim 13, wherein the recorded subset of secondary terms includes a plurality of secondary terms and the method further comprises assigning a frequency score to each secondary term of the plurality of secondary terms according to a frequency with which each secondary term occurs within the at least two documents.

18. The method of claim 17, wherein scoring each secondary term comprises assigning a frequency score to each secondary term using at least one of a term frequency-inverse document frequency process and an Okapi BM25 process.

19. The method of claim 17, further comprising displaying the plurality of secondary terms sorted by the frequency score within the search result.

20. The method of claim 19, further comprising:
receiving information identifying at least one secondary term of the plurality of secondary terms; and
identifying, responsive to receiving the information identifying the at least one secondary term, one or more additional documents including the at least one secondary term.

21. The method of claim 13, wherein the one or more documents include one or more seed documents and the method further comprises:
identifying at least one seed document of the one or more seed documents;
identifying at least one additional secondary term associated with the at least one seed document based on occurrence of the at least one additional secondary term within the at least one seed document;
identifying one or more additional documents including the at least one additional secondary term; and
providing the one or more additional documents within the search result.

22. The method of claim 21, wherein identifying the at least one seed document includes identifying the at least one seed document in response to receiving information selecting the at least one seed document.

23. The method of claim 13, wherein the correlation is based on the location of the at least one search term within an email.

24. The method of claim 13, wherein the recording the subset of secondary terms includes evaluating a rule to determine whether to record a secondary term.

25. A non-transitory computer readable medium storing instructions executable by at least one processor to execute an associative search method, the instructions being coded to instruct the at least one processor to:
receive information describing at least one search term;
execute a first query against a plurality of documents that identifies at least two documents of the plurality of documents responsive to the at least one search term, wherein the at least two documents include the at least one search term;
automatically identify one or more secondary terms included within the at least two documents based on a correlation between the at least one search term and the one or more secondary terms included within the at least two documents, wherein the correlation is based on any one of: the parts of speech embodied by the at least one search term and the one or more secondary terms, the presence of the one or more secondary terms as recorded in a search history or a location of the at least one search term within an email;
rank the one or more secondary terms across the at least two documents based on the correlation;
record a subset of secondary terms, including one or more of the ranked secondary terms;
execute a second query against the plurality of documents using the recorded subset of secondary items; and
provide, within a search result interface, a search result including the at least two documents from the first query including the recorded subset of secondary terms and one or more documents from the second query including the recorded subset of secondary terms.

26. The computer readable medium of claim 25, wherein the at least two documents include a plurality of documents and the instructions further instruct the at least one processor to limit the plurality of documents to a number of documents having a predefined relationship with a configurable parameter specifying a maximum number of documents.

27. The computer readable medium of claim 25, wherein the one or more secondary terms include a plurality of secondary terms and the instructions further instruct the at least one processor to limit the plurality of secondary terms to a number of secondary terms having a predefined relationship with a configurable parameter specifying a maximum number of secondary terms.

28. The computer readable medium of claim 25, wherein the instructions to provide the search result include instructions that instruct the at least one processor to provide at least one identifier of a bookmarked document.

29. The computer readable medium of claim 25, wherein the recorded subset of secondary terms includes a plurality of secondary terms and the instructions further instruct the at least one processor to assign a frequency score to each secondary term of the plurality of secondary terms according to a frequency with which each secondary term occurs within the at least two documents.

30. The computer readable medium of claim 29, wherein the instructions to score each secondary term include instructions that instruct the at least one processor to assign a frequency score to each secondary term using at least one of a term frequency-inverse document frequency process and an Okapi BM25 process.

31. The computer readable medium of claim 29, wherein the instructions further instruct the at least one processor to display the plurality of secondary terms sorted by the frequency score within the search result.

32. The computer readable medium of claim 31, wherein the instructions further instruct the at least one processor to:

receive information identifying at least one secondary term of the plurality of secondary terms; and identify, responsive to receiving the information identifying the at least one secondary term, one or more additional documents including the at least one secondary term.

33. The computer readable medium of claim 25, wherein the one or more documents include one or more seed documents and the instructions further instruct the at least one processor to:

identify at least one seed document of the one or more seed documents;

identify at least one additional secondary term associated with the at least one seed document based on occurrence of the at least one additional secondary term within the at least one seed document;

identify one or more additional documents including the at least one additional secondary term; and provide the one or more additional documents within the search result.

34. The computer readable medium of claim 33, wherein the instructions further instruct the at least one processor to receive information identifying the at least one seed document and the instructions to identify the at least one seed document include instructions that instruct the at least one processor to identify the at least one seed document in response to receiving the information identifying the at least one seed document.

35. The computer readable medium of claim 25, wherein the correlation is based on the location of the at least one search term within an email.

36. The computer readable medium of claim 25, wherein the secondary terms are recorded based on evaluating a rule.

* * * * *